Feb. 3, 1948.    R. J. WISE ET AL    2,435,260
SHEET FEEDER FOR FACSIMILE TELEGRAPH APPARATUS
Original Filed April 18, 1941    11 Sheets-Sheet 1

FIG. I

INVENTORS
R. J. WISE
G. H. RIDINGS
BY  R. D. PARROTT
ATTORNEY

Feb. 3, 1948. R. J. WISE ET AL 2,435,260
SHEET FEEDER FOR FACSIMILE TELEGRAPH APPARATUS
Original Filed April 18, 1941 11 Sheets-Sheet 2

INVENTORS
R. J. WISE
G. H. RIDINGS
BY R. D. PARROTT
ATTORNEY

INVENTORS
R. J. WISE
G. H. RIDINGS
R. D. PARROTT
BY
ATTORNEY

INVENTORS
R. J. WISE
G. H. RIDINGS
R. D. PARROTT
BY
ATTORNEY

Feb. 3, 1948.   R. J. WISE ET AL   2,435,260
SHEET FEEDER FOR FACSIMILE TELEGRAPH APPARATUS
Original Filed April 18, 1941   11 Sheets-Sheet 6

INVENTORS
R. J. WISE
G. H. RIDINGS
R. D. PARROTT
BY
ATTORNEY

Feb. 3, 1948.   R. J. WISE ET AL   2,435,260
SHEET FEEDER FOR FACSIMILE TELEGRAPH APPARATUS
Original Filed April 18, 1941   11 Sheets-Sheet 7
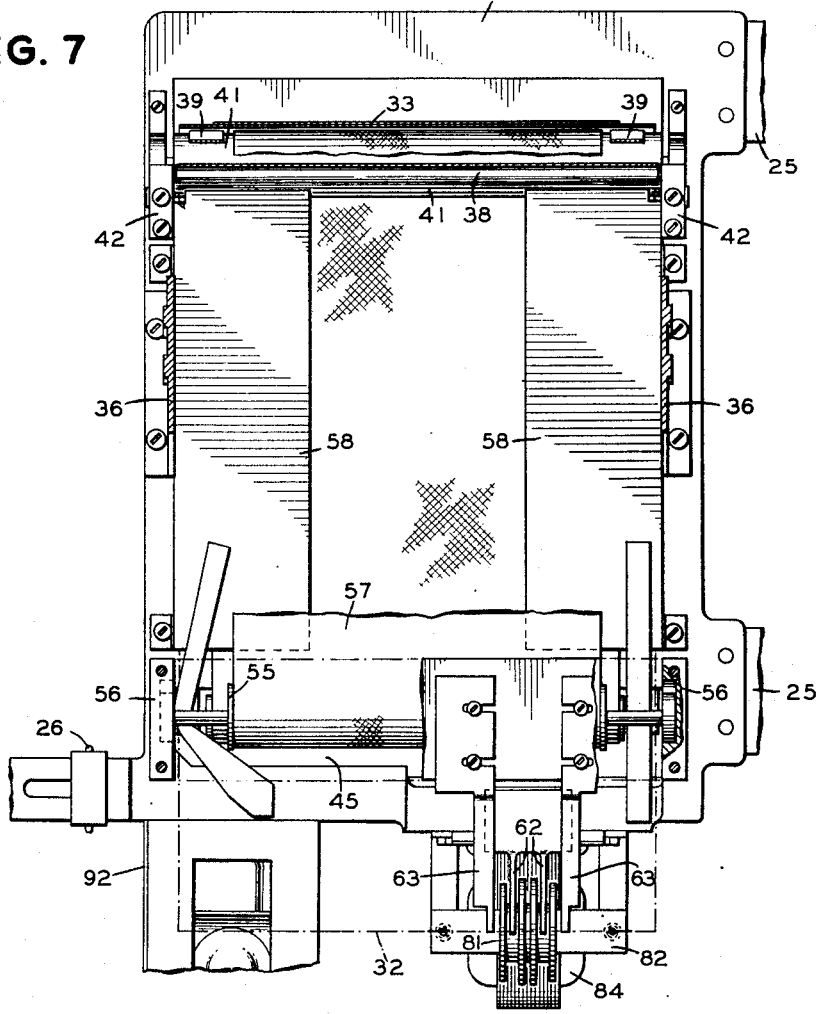
INVENTORS
R. J. WISE
G. H. RIDINGS
R. D. PARROTT
BY
ATTORNEY

INVENTORS
R. J. WISE
G. H. RIDINGS
R. D. PARROTT
BY
ATTORNEY

Feb. 3, 1948.   R. J. WISE ET AL   2,435,260
SHEET FEEDER FOR FACSIMILE TELEGRAPH APPARATUS
Original Filed April 18, 1941   11 Sheets-Sheet 9
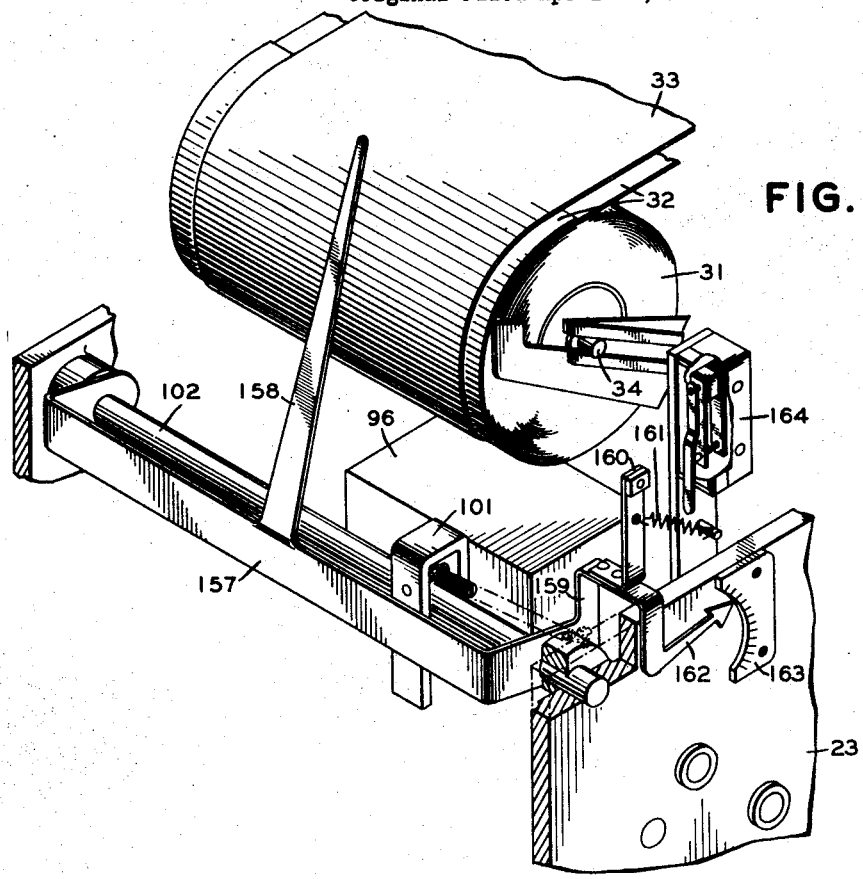
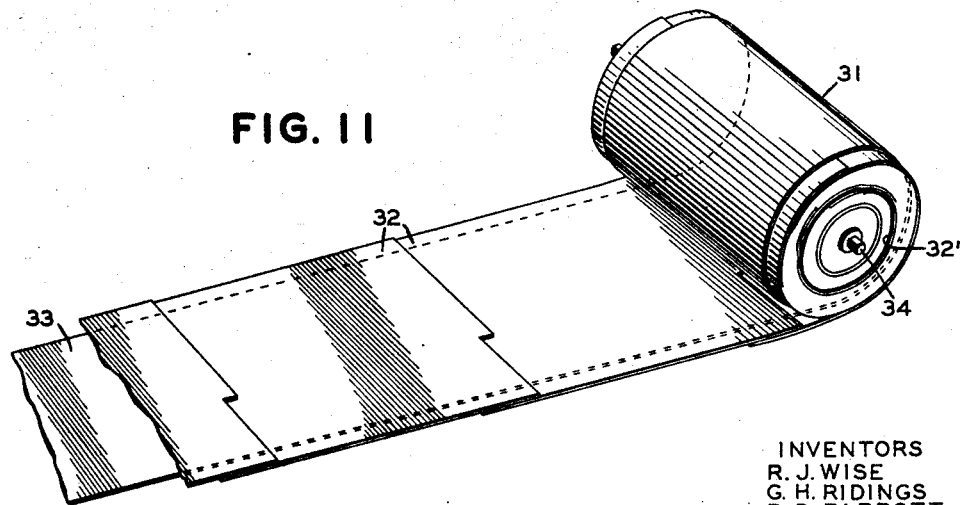
INVENTORS
R. J. WISE
G. H. RIDINGS
R. D. PARROTT
BY
ATTORNEY Feb. 3, 1948.  R. J. WISE ET AL  2,435,260
SHEET FEEDER FOR FACSIMILE TELEGRAPH APPARATUS
Original Filed April 18, 1941  11 Sheets-Sheet 10

Feb. 3, 1948.   R. J. WISE ET AL   2,435,260
SHEET FEEDER FOR FACSIMILE TELEGRAPH APPARATUS
Original Filed April 18, 1941   11 Sheets-Sheet 11

INVENTORS
R. J. WISE
G. H. RIDINGS
R. D. PARROTT
BY
ATTORNEY

Patented Feb. 3, 1948

2,435,260

UNITED STATES PATENT OFFICE 2,435,260

SHEET FEEDER FOR FACSIMILE TELEGRAPH APPARATUS

Raleigh J. Wise, Dunellen, Garvice H. Ridings, Summit, and Robert D. Parrott, West New York, N. J., assignors to The Western Union Telegraph Company, New York, N. Y., a corporation of New York Original application April 18, 1941, Serial No. 389,164. Divided and this application October 3, 1942, Serial No. 460,603

4 Claims. (Cl. 271—8)

1

This invention relates to automatic telegraph machines and more particularly to facsimile receivers for recording incoming messages on successive recording blanks.

This application is a division of our copending application, Serial No. 389,164, filed April 18, 1941, now Patent No. 2,365,741, granted December 26, 1944.

A well-known type of commercial facsimile machine employs a rotating scanning drum or recording cylinder around which is wrapped a recording blank in the case of a receiver or some form of message sheet bearing the copy to be sent in the case of a transmitter. The scanning mechanism also includes, in the case of a receiver, for example, a recording stylus which is moved longitudinally along the face of the blank on the cylinder as it rotates. The blank is usually some form of recording paper capable of being marked by incoming electric signal impulses which pass through it from the stylus either to the cylinder or to some other form of ground return.

One disadvantage heretofore encountered in this type of machine has been the necessity of loading and unloading the individual cylinders with the recording blanks, an operation requiring time and skill.

An object of this invention is to provide a facsimile telegraph machine of the rotating cylinder type constructed and arranged to automatically load and unload the recording cylinder with successive recording blanks, message sheets, or the like.

A still further object is to provide an improved feeding mechanism for automatically supplying separate recording blanks, or the like, to a facsimile machine.

These and other objects which will be apparent to those skilled in the art are accomplished by the present invention, one embodiment of which is illustrated in the accompanying drawings, in which.

Figure 1:
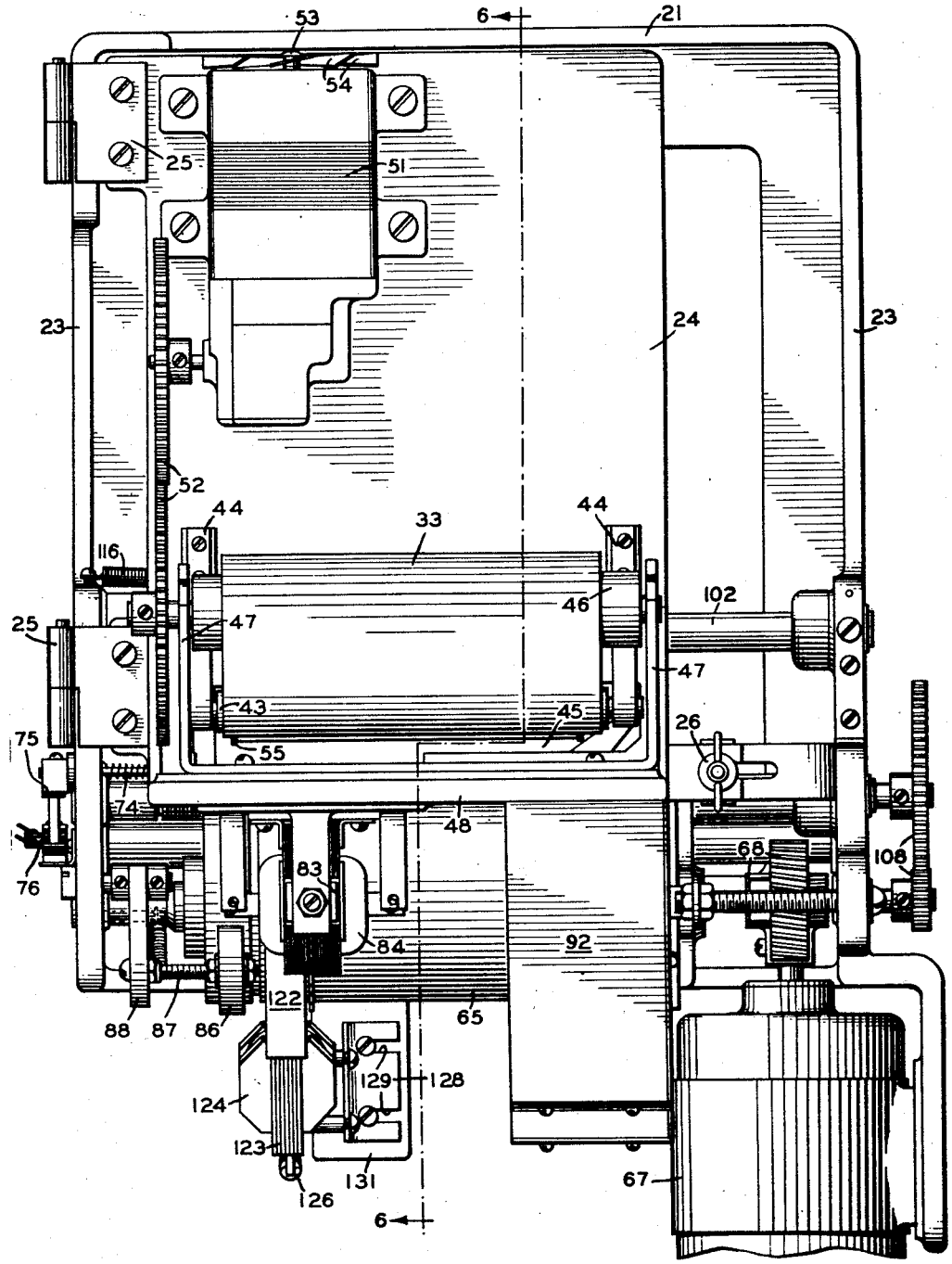
Fig. 1 is a front elevation of a facsimile receiver constructed in accordance with one embodiment of the invention.
Figure 2:
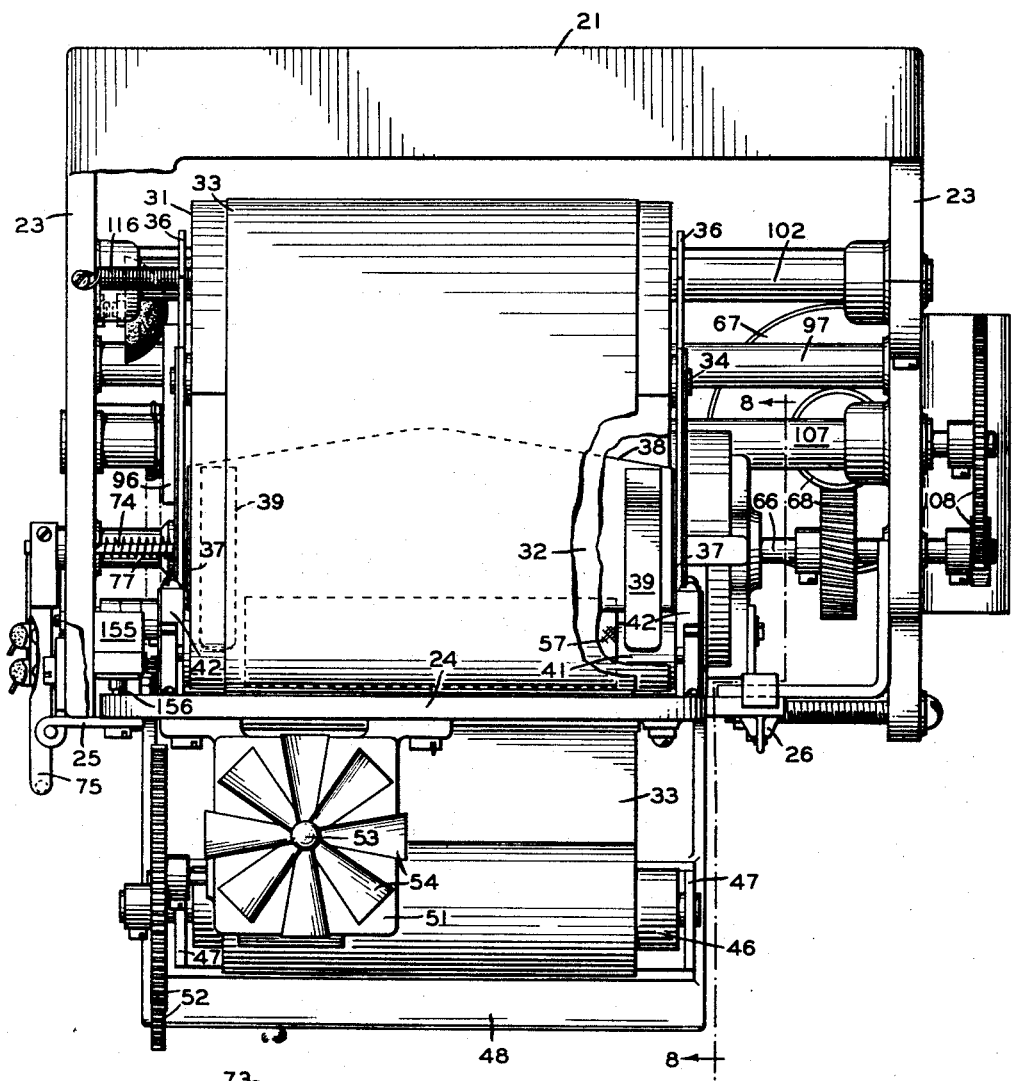
Fig. 2 is a top plan view of the machine shown in Fig. 1.
Figure 13:
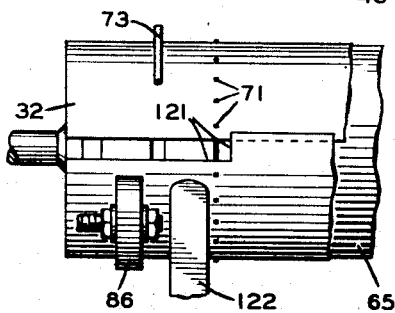
Figure 6:
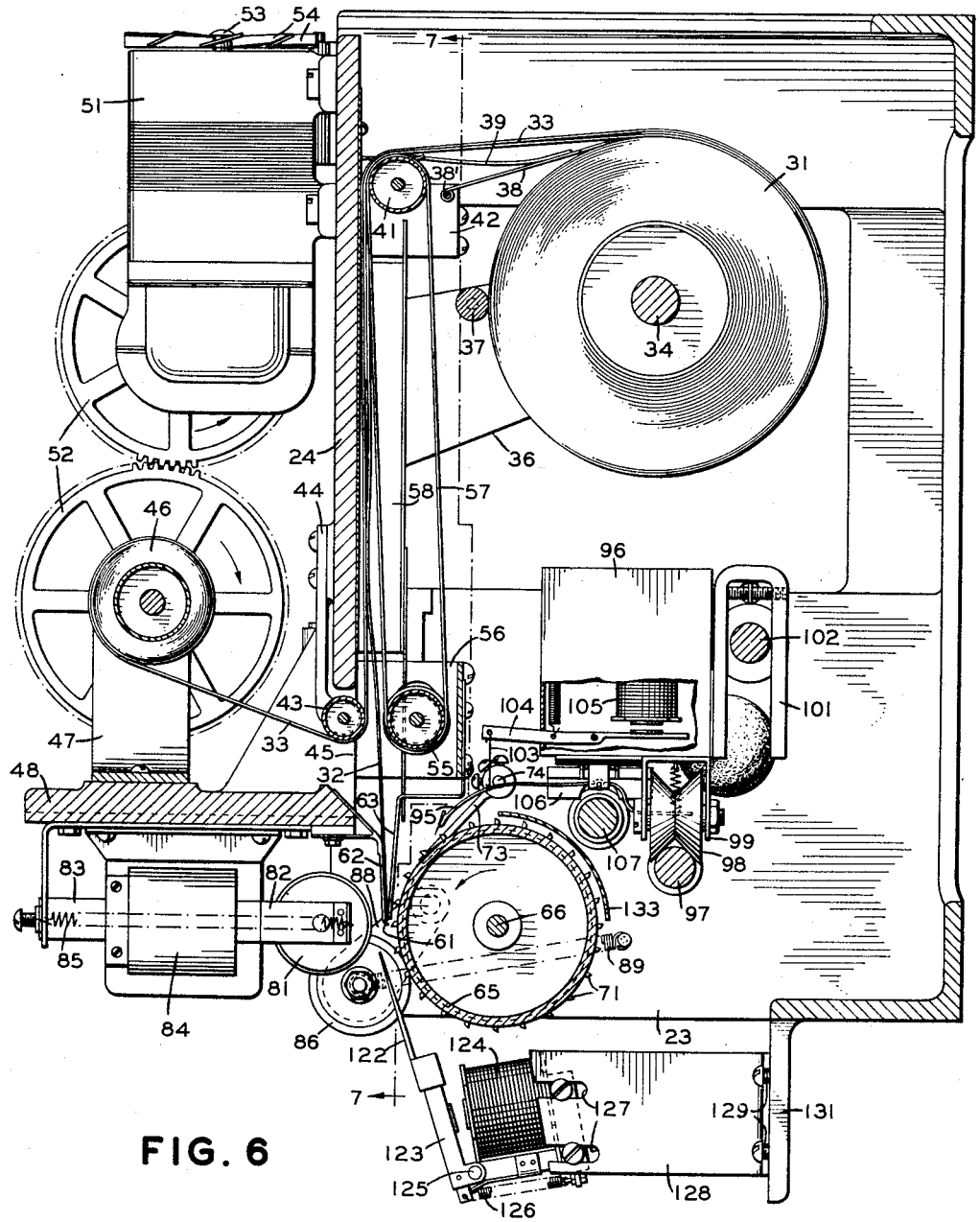
Fig. 6 is a transverse section on the line 6—6
Figure 9:
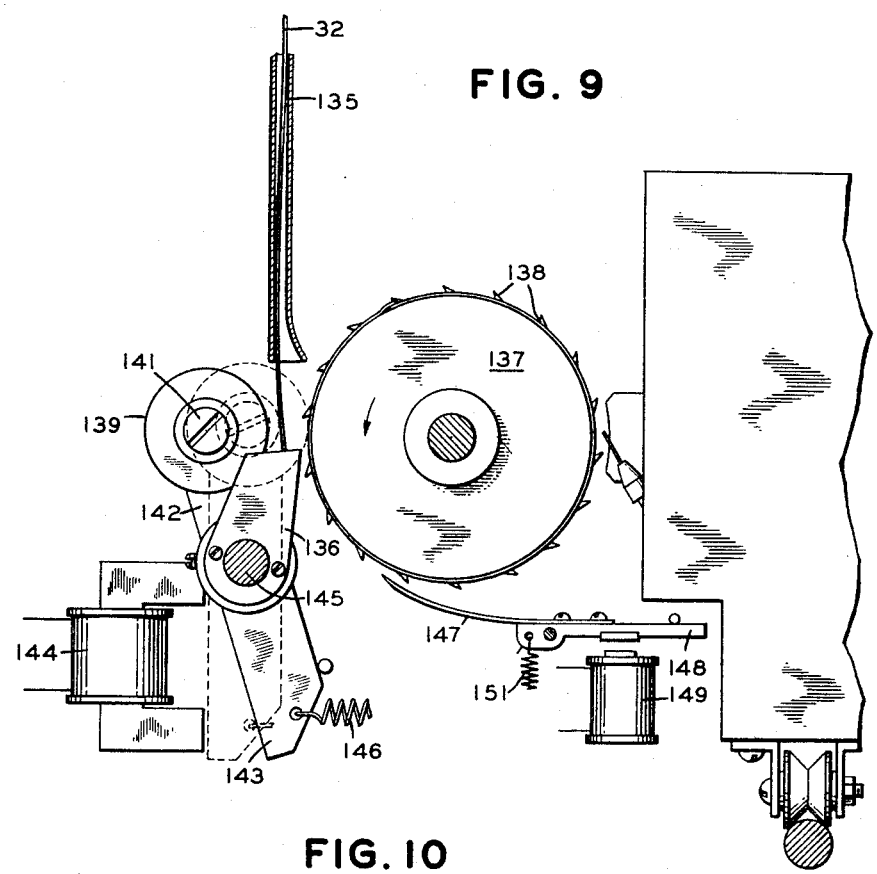
Figure 10:
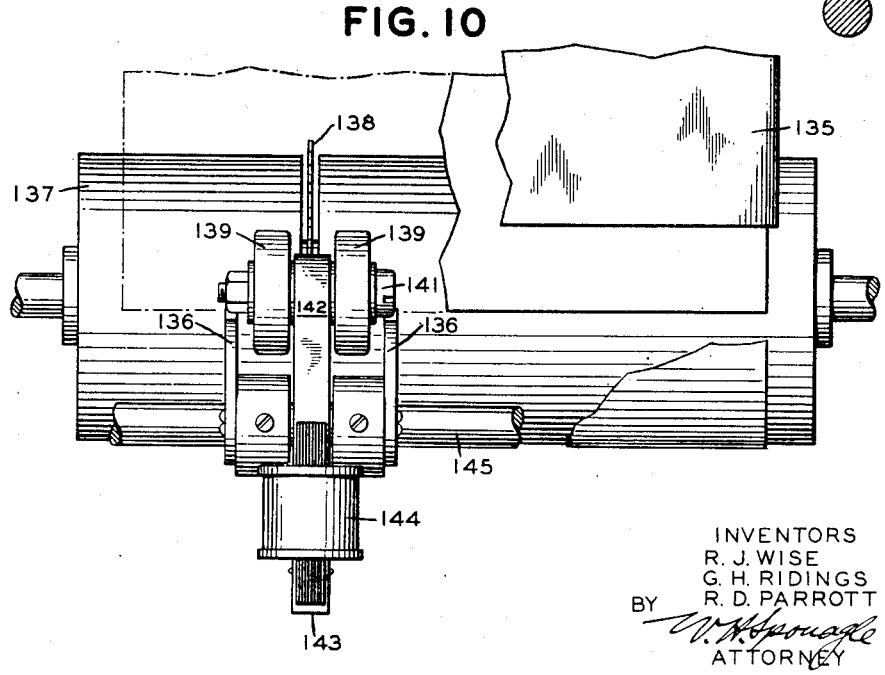
Figure 14:
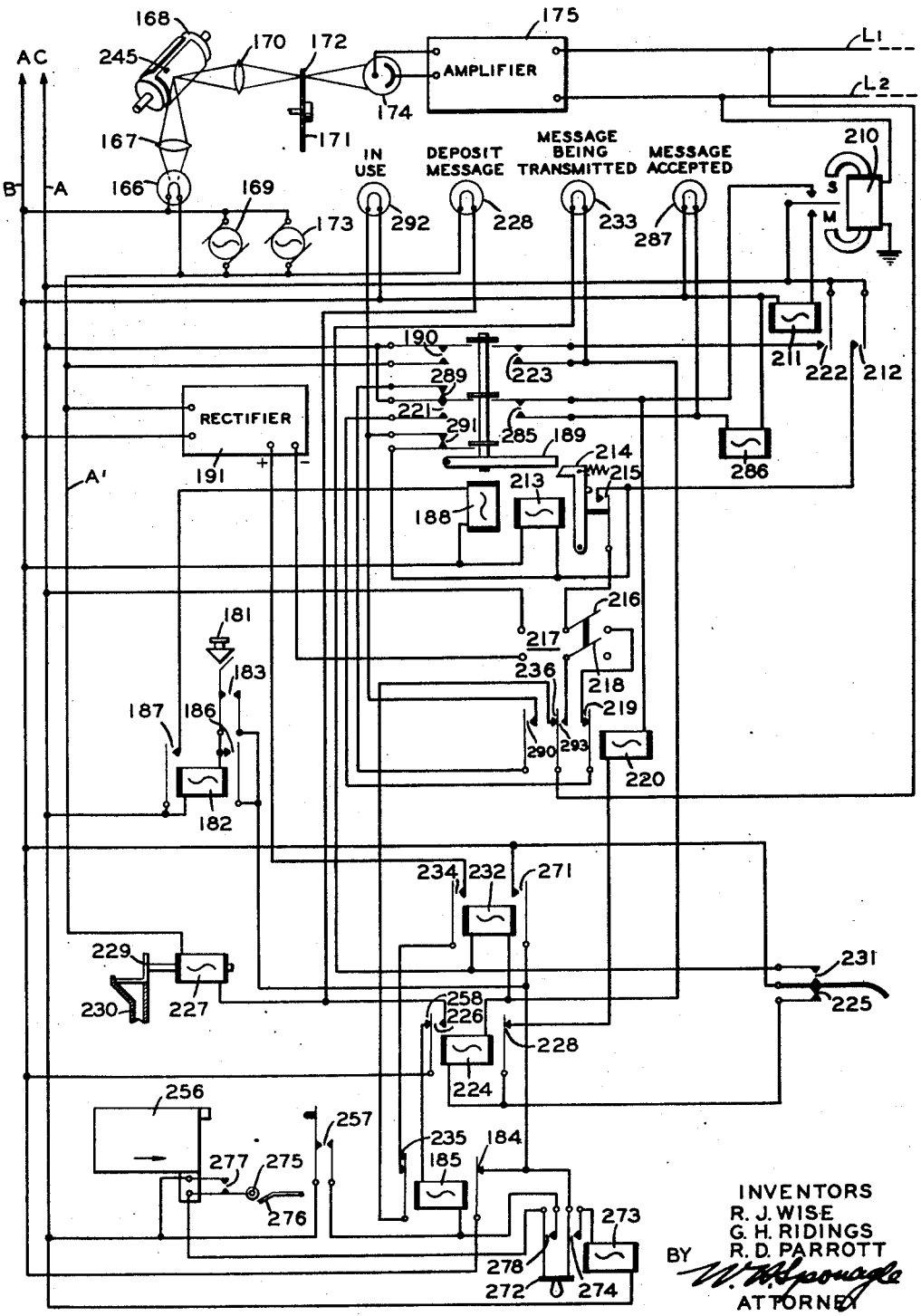
Figure 15:
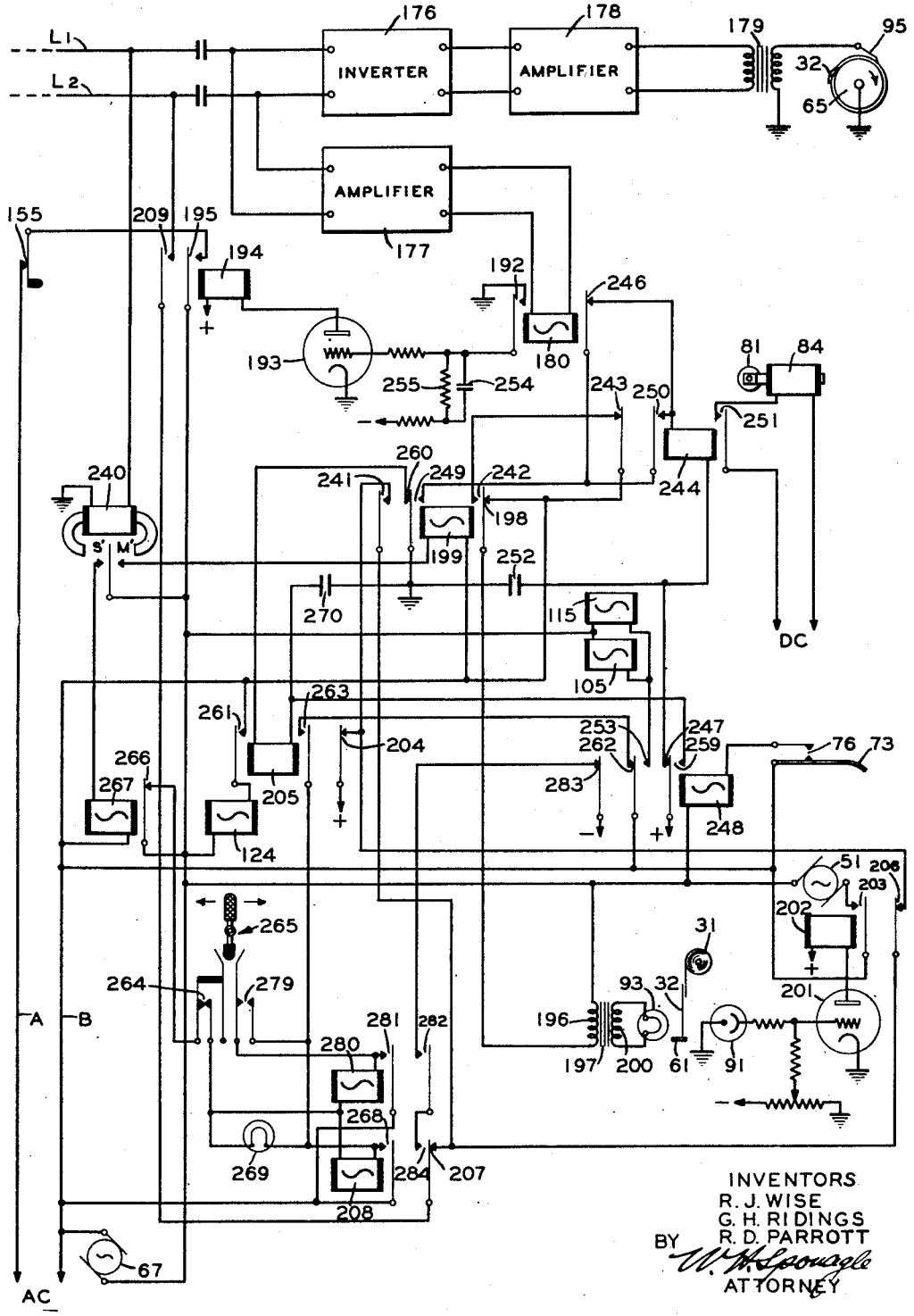

2 of Fig. 1, looking in the direction of the arrows;

Fig. 7 is a similar view on the line 7—7 of Fig. 6;

Fig. 8 is a partial sectional view on the line 8—8 of Fig. 2;

Fig. 9 is a view similar to Fig. 6, showing a modified embodiment;

Fig. 10 is an elevation looking from the left in Fig. 9, certain of the parts being omitted;

Fig. 11 is a view of the recording blank supply reel;

Fig. 12 is a fragmentary view of a modification to provide a visual indication of the approximate number of blanks remaining on the supply roll;

Fig. 13 is a view of a recording blank detail;

Fig. 14 is a wiring diagram showing one circuit arrangement for a transmitter adapted to control from the transmitting end of a line the operation of the receiver forming the present invention; and Fig. 15 is a wiring diagram showing one circuit arrangement for controlling and operating the machine of the present invention.

The novel control features whereby a transmitter and a recorder according to the instant invention are coordinated for operation are claimed in the aforementioned copending application.

The illustrated embodiment of the invention shows a supporting frame 21 having forwardly projecting side walls 23 and a front panel 24 mounted on hinges 25, permitting the panel to be swung open, giving access to the mechanism mounted within the frame and also on the inner face of the panel. Any suitable fastener or lock 26 can be employed to secure the panel in closed, operative position. This panel is employed to support the complete feeding mechanism for delivering successively individual recording blanks to the recording mechanism.

As illustrated, the paper feed includes a roll 31 of individual blanks supported preferably in overlapping relation, as shown in Fig. 11, on an elongated belt 33 of any suitable material, the end of the belt being secured to a mandrel 34. The belt and supported blanks are rolled together around the mandrel to form a blank supply roll 31.

The opposite ends of the mandrel 34 are supported in inclined slots 35 in reel supporting bracket arms 36 mounted on the inner face of the hinged panel 24. A rod 37 extends between the arms and is engaged by the face of the supply reel. As the reel is reduced in diameter through use the mandrel will slide down the inclined slots 35, keeping the face of the reel in contact with the rod 37, which thus serves as a brake to prevent overrunning of the reel after the hereinafter described movement of the belt has ceased. A guide plate 38 extends across the width of the reel and is pivotally supported along one edge on a pivot 38'. The other edge rests on the reel under the rim of the belt as it is drawn off. The plate prevents any blank from following the reel rather than being drawn off with the belt. A pair of guide straps 39 direct the blanks across and over an idler roller 41 rotatably supported by brackets 42 near the top of the panel 24. From the idler roller 41 the belt passes downwardly around a second idler roller 43, rotatably supported by brackets 44 in a slot 45 adjacent the bottom edge of the panel, and thence to a belt take up reel 46 rotatably mounted on the spaced arms 47 of a bracket secured to the supporting shelf 48 provided at the bottom of the panel 24 on the outside thereof. As illustrated, the take up reel is received in slots 49 in the bracket arms 47. With the above described arrangement of pivoted guide plate 38 and guide straps 39, it is not necessary to overlap the blanks on the supporting belt of the supply reel in order to feed them across the roller 41 as the plate and straps insure this operation. Nevertheless, even when the plate and straps are employed, it will usually be preferable to overlap the blanks in order to provide as many blanks as possible within a given length of belt. The arrangement of the plate and inclined slots 35 is such that the plate remains substantially tangent to the supply roll at all times.

The take up reel can be driven by any suitable mechanism such, for example, as a motor 51 mounted on the outside of the panel 24 above the reel and connected thereto through gearing 52. The motor shaft 53 extends above the motor housing and is provided with vanes 54 for ventilating and cooling the housing.

A third idler roller 55 generally similar to the idler roller 41, see Fig. 6, is mounted in brackets 56 at the bottom of the panel 24 adjacent the panel slot 45. An endless belt 57 passes over the vertically spaced idler rollers 41 and 55.

It will be apparent that the belts 33 and 57 form the moving side walls of a chute having stationary end walls 58 secured to the panel 24. The recording blanks pass down the chute to the recording mechanism hereafter described. As illustrated, the belts diverge slightly from top to bottom. Obviously, operation of the take up reel 46 unwinds the belt 33 and associated blanks from the supply roll 31, drawing them over the upper idler roller 41 and belt 57 which are thereby caused to move simultaneously therewith. As indicated in Fig. 6, unwinding of the belt 33 and blanks 32 releases the latter one at a time, permitting them to drop into position to be delivered to the recording cylinder. This position is definitely determined by stops formed by ledges 61 at the lower ends of stop fingers 62 extending downwardly from the shelf 48. A pair of cooperating fingers 63 extending downwardly from the bearing bracket 56 is located on opposite sides of the stop fingers 62 and guide the lower edge of the blank into engagement therewith, see Figs. 6 and 7.

A scanning drum or recording cylinder 65 is mounted on a shaft 66 rotatably supported in the frame side walls 23. The shaft 66 is rotated from any suitable source of power, such as a motor 67, through worm gearing 68. A circumferential series of blank holding teeth 71 extends around the cylinder adjacent one end thereof and projects beyond the periphery a sufficient distance to pierce a blank and hold it on the cylinder in the manner hereinafter described. The shape of the individual teeth can be varied, but a more or less saw-tooth shape has been found satisfactory.

A peripheral groove 72 is formed in the cylinder and receives a finger 73 secured to a rod 74 rotatably mounted in the adjacent frame side wall 23 through which it extends. The projecting end of the rod 74 carries a switch actuating arm 75 for operating the switch 76 mounted on the side wall. A torsional spring 77, see Fig. 5, surrounding the rod, has one end secured in the frame wall and the other secured to a collar 78 fastened on the rod 74 for normally pressing the finger 73 into the slot 72. Obviously, when a blank is in position on the cylinder, the finger is held out of the slot, thus raising the switch actuating arm 75. Through this switch the finger 73 controls the half nut magnet, the stylus magnet and the phasing magnet.

A blank 32 which is in the position shown in Fig. 6, with the lower edge resting on the ledge 61 of the stop finger 62, is delivered to the rotating recording cylinder at the desired moment by a pusher mechanism which is illustrated as formed by grooved rollers 81 rotatably supported on one end of a frame 82 connected to the projecting end of a core 83 of a solenoid 84 biased by tension springs 85 away from the drum. As shown in Fig. 7, the rollers are grooved to accommodate the fingers 62. When the solenoid is energized, usually by a phasing pulse received from a distant transmitter, the grooved rollers 81 are projected against the adjacent edge of the blank 32, forcing it against the teeth of the rotating cylinder, which pierces the blank and draws it into the cylinder, around which it is wrapped.

A presser roller 86 is rotatably mounted on a stem 87 projecting outwardly from a bracket arm 88 movably supported on the frame side wall. A spring 89 draws the roller yieldingly against the face of the drum holding the blank against twisting during the stripping operation hereinafter described.

As soon as a blank is removed from the stop finger 62 and delivered to the recording cylinder, the take up reel 46 is operated, drawing the belt 33 off the supply roll until the next blank 32 is deposited on the stop finger, which serves to stop further operation of the take up reel. The mechanism for controlling the operation of the take up reel through its motor 51 is illustrated in Fig. 8 as comprising a photocell 91 located in a housing 92 hung below the shelf 48 on the hinged panel 24. A lamp 93 for actuating the photocell is also mounted thereon, and a reflector 94 is positioned to reflect light from the lamp to the cell, the reflector being located as shown so that light from it to the cell is cut off by the presence of a blank on the stop finger 62. This serves to open the circuit of the take up reel motor 51, as hereinafter described, and discontinues further blank feed until the proper time.

The scanning electrode or recording stylus 95 and associated mechanism are mounted on and in a scanning box 96 supported for scanning movement longitudinally of the cylinder 65 on a rod 97 by a beveled roller 98 mounted in brackets 99 on the bottom of the box. An inverted U-shaped bracket 101 on the back of the box slidably embraces a guide rod 102. It will be apparent that the scanning box can be easily removed from the machine merely by lifting off the support and guide rods and as easily replaced. The stylus 95 is connected, see Fig. 6, by a wire 103 to the projecting end of the vertically movable armature 104 of the stylus magnet 105 mounted on the scanning carriage.

Figure 3:
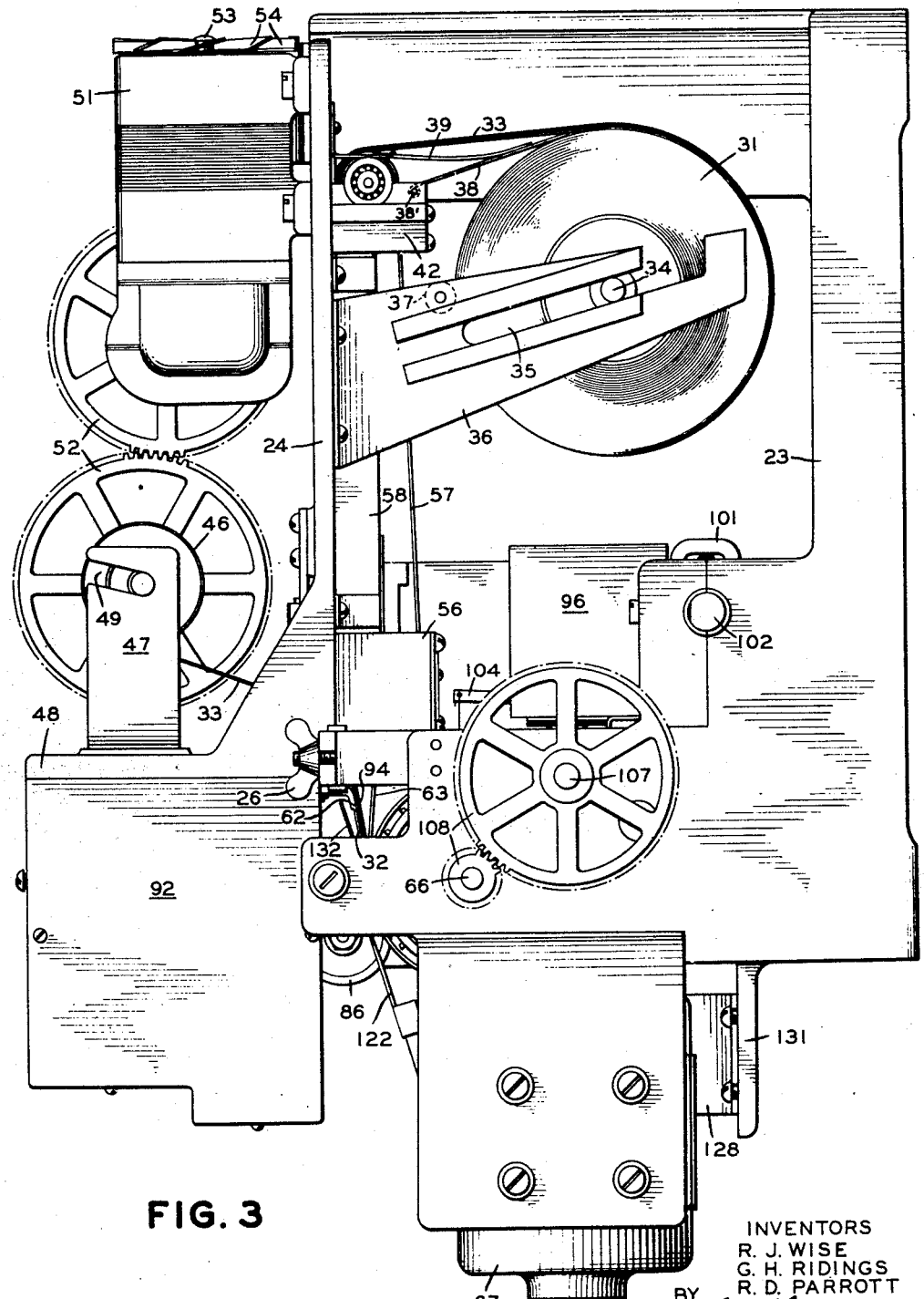
Fig. 3 is a side elevation looking from the right in Fig. 1.
Figure 4:
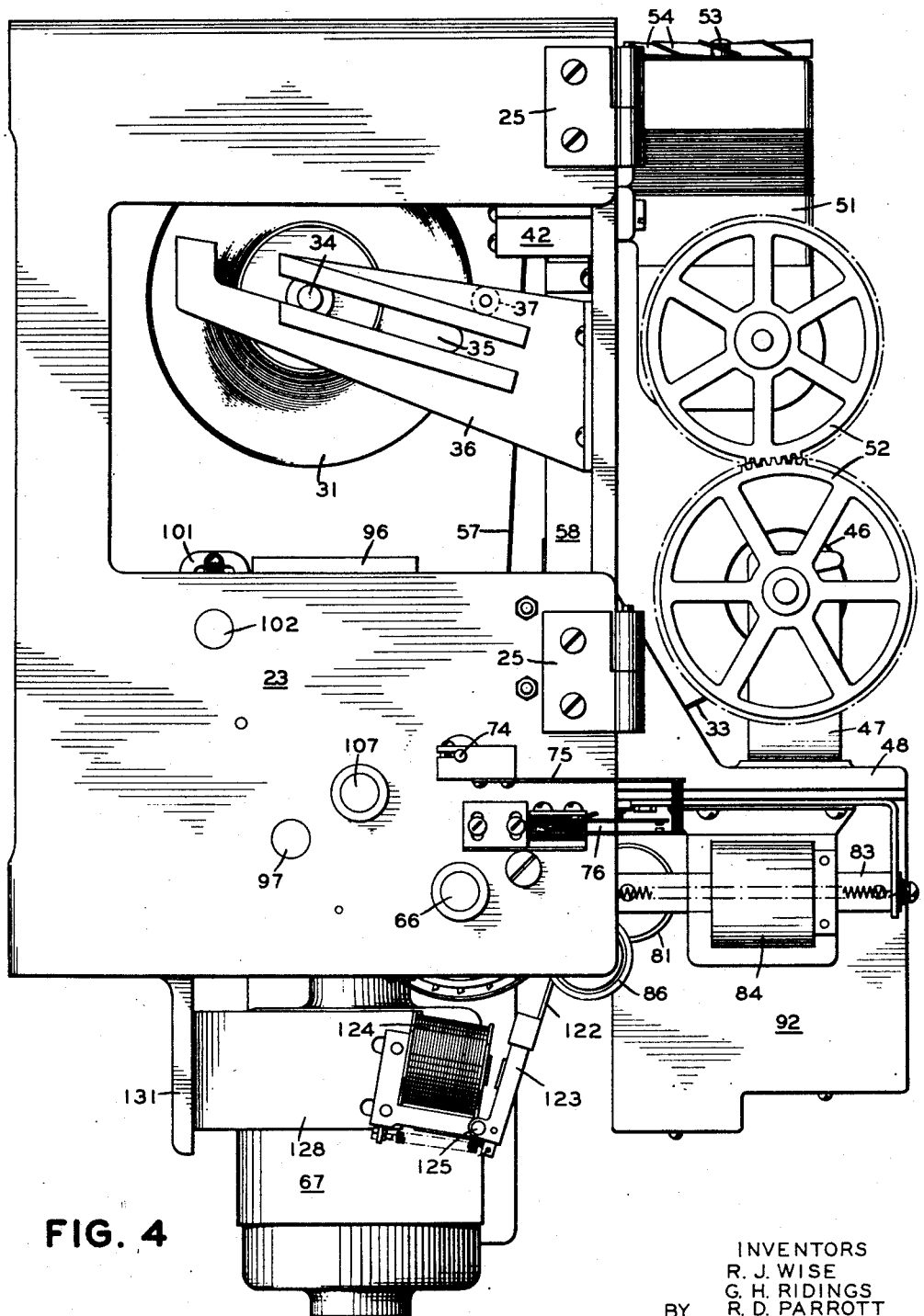
Fig. 4 is a similar view looking from the left in Fig. 1.

A half nut 106 is located under the bottom of the scanning box for vertical movement into and out of engagement with a feed screw 107 mounted for rotation in the frame side walls 23 and driven from the shaft 66 of the recording cylinder 65 through gearing 108, see Figs. 1 to 3. The gears 108 can be changed to vary the number of lines scanned per inch, and for this purpose are located in a readily accessible position on the outside of the frame.

Scanning movement of the carriage 96 occurs when the half nut magnet 115 mounted in the carriage is energized to shift the half nut 106 into engagement with the feed screw 107. Any conventional mechanism such as that shown can be employed for connecting the half nut to the magnet armature for movement therewith. At the end of the scanning operation the half nut is disengaged from the feed screw and the carriage returned to its original position, shown in Fig. 5, by a coil spring 116 connected between the side wall 23 and the inverted U-shaped bracket secured to the carriage.

As illustrated in Fig. 13, the circumference of the recording cylinder 65 is such that when a blank 32 is wrapped around the cylinder for scanning its edges overlap slightly. In order to facilitate stripping the blank from the drum after scanning, each blank has a notch 121 formed in one corner in such a way that when on the drum the notch provides an open space between the edges at one end. This space permits a stripping finger 122 extending upwardly from the armature 123 of a magnet 124 to be inserted through the open space and under a blank for the purpose of stripping it from the drum. Obviously the notch or cutaway portion 121 may be of any practical shape to provide sufficient space for insertion of a stripping finger. The overlapping edges of blank 32 permit the recording stylus to ride over the rotating sheet without encountering a gap and striking the cylinder. It is to be understood, of course, that the recording area of the blank lies to the right of notch 121 and holding teeth 71, as viewed in Fig. 13. The armature is pivoted on a pin 125 and biased by a coil spring 126 into inoperative position. The magnet assembly is adjustably mounted in slots 127 in a bracket 128, in turn adjustably mounted by means of slots 129 on a hanger 131 below the frame 21, see Figs. 1 and 6. By this means the stripper finger is adjustable diametrically and longitudinally of the scanning drum.

Figure 5:
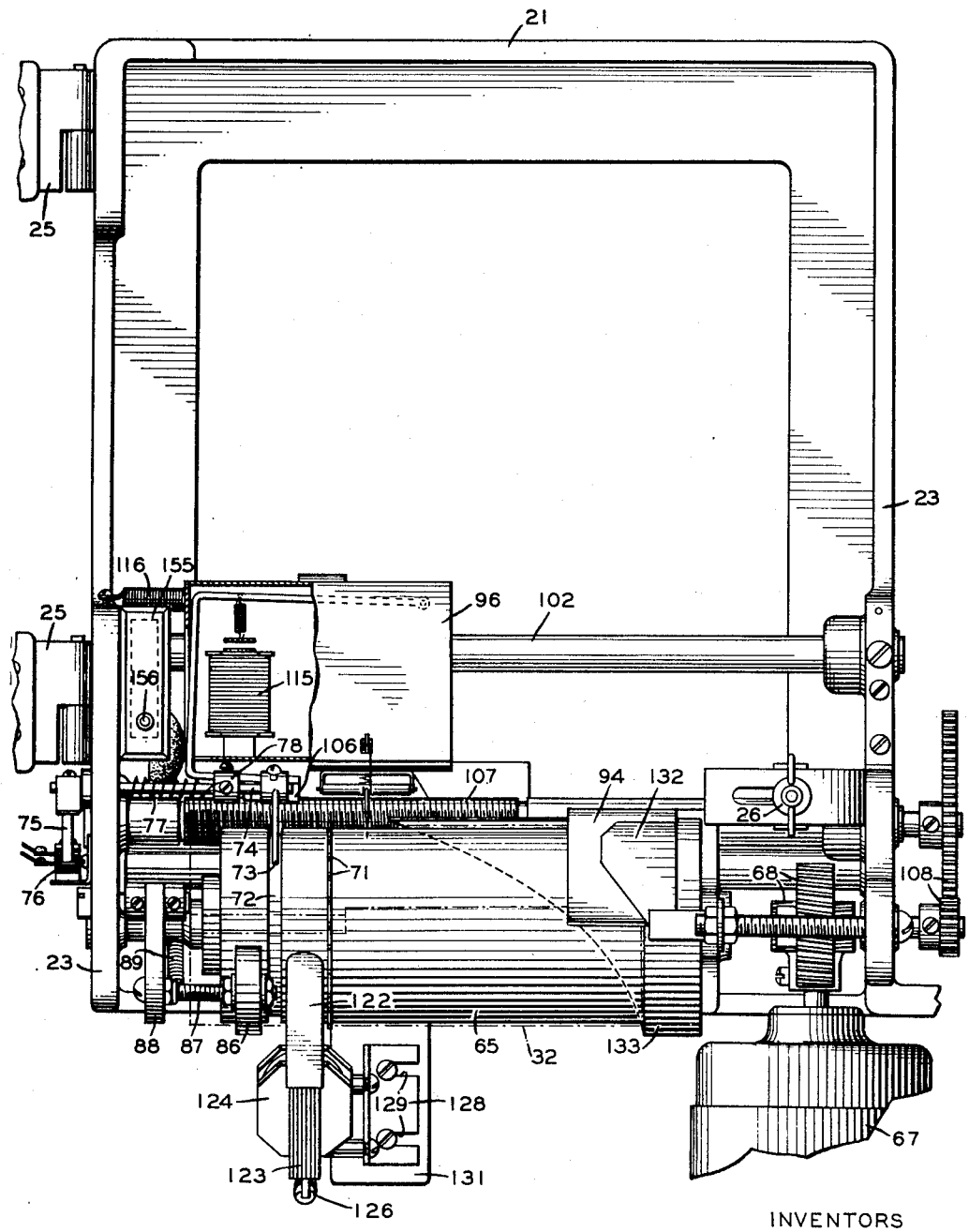
Fig. 5 is a view similar to Fig. 1 but with the front panel swung to open position to show the interior of the machine.

At the right hand end of the recording cylinder, as shown in Fig. 5, a guide plate 132 is provided for guiding the blank 32 as it is drawn onto the cylinder, and a circular guide strip 133 extends around a substantial part of the same end of the cylinder to keep the blank at that end from moving away from the cylinder.

Figs. 9 and 10 illustrate a modified embodiment of the invention which is particularly adapted to the hand feeding of individual blanks. As illustrated, a chute 135 is provided in which an individual blank 32 is inserted by hand. The blank is definitely located in feeding position by a pair of stop fingers 136 having flat upper faces on which the blank rests. The scanning mechanism may be of any desired type, such as that described above, and includes a rotary recording cylinder 137 and blank holding teeth 138. The blank is delivered to the cylinder at the proper moment by a pair of presser rolls 139 rotatably mounted on a shaft 141 supported in the upper end of an arm 142 forming an extension of an armature 143 of a magnet 144, the energization of which is controlled by a phasing pulse from a remote transmitter, or in any other desired way. The armature is pivoted on a supporting shaft 145 and is biased by a spring 146 to normally hold the rolls 139 in inoperative position. As illustrated, the stop fingers are supported on the armature supporting shaft 145.

In this modification any form of stripper can be employed for stripping the blank from the cylinder such, for example, as the finger 147 supported on a pivoted arm 148 forming the armature of a magnet 149 adapted to shift the finger into operative stripping position upon being energized. A spring 151 normally biases the finger into inoperative position.

Referring to Figs. 1 to 8, the operation of the mechanical features thus far described will be obvious. Assuming a blank to be in feeding position on the stop finger 62, upon receipt of a phasing impulse the magnet 84 is energized, causing the presser rollers 81 to be projected to the right in Fig. 6, pressing the lower edge of the blank into engagement with the rotating cylinder 65, the teeth 71 of which penetrate the blank and cause it to be wrapped around the cylinder with the edges overlapping except at the notch 121. Removal of the blank from the stop finger 62 uncovers the reflector 94, permitting the lamp 93 to actuate the photocell 91 to close the circuit of the paper feed motor 51, causing the take up reel to draw the belt 33 off the supply roll 31 until the next blank has been released and drops onto the stop finger 62, cutting off light to the cell and discontinuing further blank feeding.

During the scanning operation the carriage feed screw 107 is rotated from the motor 67 through the drum shaft 66 and driving gears 108 to produce the necessary scanning movement of the carriage and stylus longitudinally of the rotating cylinder. Incoming signal impulses cause the stylus to record on the blank the incoming messages. When the scanning operation is complete, the half nut is disengaged from the carriage feed screw, permitting the carriage to be returned to its starting position by the spring 116. Also, the stripper magnet 124 is energized, causing the stripper finger to strip the recorded blank from the cylinder. If desired, a suitable bin or receptacle, not shown, can be provided for receiving the recorded blanks as they are stripped from the cylinder.

It will be apparent that the entire blank feeding mechanism is mounted on the front panel 24 and is readily accessible for adjustment or repair upon merely opening the hinged panel. A control switch 155 in the main power line to the machine is operated to cut off power from the machine by opening the panel and releasing the operating plunger 156 of the switch.

In order that an attendant may be apprised of the fact that the supply of recording blanks is approaching the point of depletion, one expedient which is contemplated is the inclusion in the series of blanks of one having a different marking or color than the others. Such a blank 32' (Fig. 11) may be placed in the supply roll so that it will be followed by a predetermined small number of other blanks before the supply is exhausted. Upon noting the appearance of such a distinctively colored blank, the attendant may make preparations for the substitution of a new supply roll of blanks in time to prevent the recorder from becoming disabled by reason of the exhaustion of the supply of recording blanks.

An alternative arrangement for giving at all times a visual indication of the condition of the supply roll, and at the same time providing a brake for the roll, is illustrated in Fig. 12. A U-shaped bracket 157 is pivotally mounted on the guide rod 102 in such a manner that the pivot points are spaced sufficiently along the rod and the bracket is spaced outwardly from the rod sufficiently to permit the free movement of the U-shaped bracket 101 attached to the back of the scanning box 96. An arm 158 is attached to the bracket 157 and extends upwardly to be pressed firmly against the outside of the supply roll 31, the mandrel 34 of which, in this case, is mounted for rotation in any convenient brackets. Also attached to one end of the bracket 157 is a second U-shaped member 159 which extends upward and over the end bearing plate 23. An upstanding arm 160 is attached to the outer end of the U-shaped member 159 and in turn has attached adjacent the upper portion thereof a spring 161, the other end of which is attached to any convenient support so that the unitary bracket structure is urged in a manner to cause the arm 158 to bear upon the supply roll 31 with sufficient force to act as a brake. As the size of the roll decreases, the arm 158 is thus maintained in contact with the outside of the supply roll. An indicator or pointer 162 is rigidly secured to the outer end of the U-shaped member 159 and is adapted to be moved over a graduated scale 163. A suitable aperture may be formed in the cover or housing for the apparatus so that the scale may be viewed from without.

A switch 164 may be mounted adjacent the upper end of the arm 160 so that it may be operated at a predetermined point upon engagement by the arm to close a circuit for operating an alarm signal such as a bell, buzzer, lamp, or some combination thereof.

A control circuit for the facsimile recorder described is shown in Fig. 15 wherein the elements of the recording mechanism are shown diagrammatically and are identified by the same characters of reference used in the foregoing description. Such a recorder is designed to be operated preferably in conjunction with a substantially similar machine functioning as a transmitter. The control circuits of such a transmitter are shown in Fig. 14 together with diagrammatic representations of a well-known optical scanning mechanism.

The transmitter is provided with a conveying chute which is in communication at the lower extremity thereof with the scanning cylinder and is arranged to be accessible at the upper extremity thereof from the outside of the machine so that a sheet containing the subject matter to be transmitted may be inserted. Such a chute may be similar in construction to the chute 135 shown in Fig. 9 and having the additional facility of a movable member which may be actuated to open or close the upper end of the chute. The scanning cylinder of the transmitter is provided with circumferential teeth similar to those of the recording mechanism described for the purpose of gripping a sheet conveyed to it by gravity through the chute and securing it to the cylinder for scanning. The transmitter is also provided with means for removing the sheet from the cylinder following a scanning operation which is similar to that shown and described for the recorder. Also, housed in a carriage similar to the recorder scanning box 96 is an optical scanning mechanism which may be similar to any well-known arrangement, comprising a source of light and a system of lenses for condensing the light to a small scanning spot directed to the scanning cylinder and for directing the light reflected from the cylinder onto a photoelectric cell with a light chopper for interrupting one of the beams periodically. Such mechanism is shown in Fig. 14 diagrammatically.

For the generation of the facsimile signals by the transmitter an exciter lamp 166, when energized, emits a beam of light which is condensed by a lens 167 to a small spot, which is directed to impinge upon the scanning cylinder 168 rotated by a motor 169. The light which is reflected from the subject matter mounted upon the scanning cylinder is again condensed by a lens 170 to a point at which is located an interrupter or chopper 171, which may be in the form of a perforated disc, or one which is provided with a plurality of peripheral notches, such as 172. The light chopper is rotated by means of a suitable motor 173 at a predetermined rate whereby the reflected light beam is alternately transmitted and interrupted at any desired frequency, depending upon the speed of rotation of the disc and the number of notches or perforations with which it is provided. The light which is transmitted through the light chopper is directed onto a photoelectric cell 174, the output of which is passed through an amplifier 175 and impressed upon a pair of line conductors L1 and L2.

At the receiving station these line conductors are connected in multiple to a signal inverter 176 and an amplifier 177. The inverter 176 is connected to an amplifier 178, which in turn is coupled by means of a transformer 179 to the recording circuit which includes the stylus 95, the recording blank 32 and the cylinder 65. At times when no recording is being done, the stylus 95 is dissociated from the recording cylinder. By reason of its connection to the line conductors the amplifier 177 passes all of the facsimile signals to control the operation of a relay 180, the function of which will be described hereinafter.

Assume that the circuit is idle and that both the transmitting and receiving apparatus are not connected to a source of power. Someone wishing to send a message from the transmitter, after having first inscribed the message upon a suitable blank provided for that purpose, operates a push button 181 at the transmitter, operating a relay 182 by reason of a circuit extending from the A bus bar of a source of alternating current potential through the winding of the relay, the push button contact 183, the break contact 184 of a relay 185, to the B bus bar of the alternating current supply. A make contact 186 of the relay 182 is connected in parallel with the push button contact so that the relay becomes locked, permitting the release of the push button. Through the make contact 187 of this relay the A bus bar is connected to one terminal of the winding of a relay 188, the other terminal of which is connected to the B bus bar, thus energizing this relay to move its armature 189 downward to actuate a plurality of switch contacts associated therewith. The closure of one of these contacts 190 connects the A bus bar of the alternating current source to a secondary bus bar which is labeled A'. Connected between the bus bar A' and the bus bar B are the driving motor 169 for the scanning cylinder 168 and the feed screw for advancing the carriage housing the optical scanning apparatus and also the motor 173 for driving the light chopper disc 171. Also, a rectifier 191 is connected to the alternating current source. It is presumed that the amplifier 175 is at all times conditioned for operation. The exciter lamp 166 is energized so that an unmodulated carrier current of maximum amplitude is generated by the reflection of the light from the cylinder 168 and is transmitted over the line conductors to the receiving station.

The received signals, suitably amplified by the amplifier 177, being of maximum amplitude, cause the operation of relay 180. Through a make contact 192 of this relay the input circuit of a vacuum tube 193 is energized to close the plate circuit thereof, thereby energizing a relay 194 connected in series with the output circuit of the tube. The closure of make contact 195 of this relay connects the A bus bar of a source of alternating current potential through the panel controlled switch 155 to one terminal of the primary winding 196 of a transformer 197, the other terminal of which is connected through a break contact 198 of a relay 199 to the B bus bar. The light source 93 is connected to the secondary winding 200 of the transformer 197 and, therefore, is energized.

If it be assumed that the recorder is in a condition such that there is no recording blank in position to be placed upon the drum, then the light from the lamp 93 falls upon the photocell 91, thereby energizing the input circuit of a vacuum tube 201. Connected in the output circuit of this tube is a relay 202 which thus becomes energized to close its make contact 203, thereby connecting one terminal of the blank feed motor 51 to the B bus bar. The other terminal of this motor is connected through the make contact 195 of relay 194 and the switch 155 to the A bus bar. The operation of this motor conveys one of the recording blanks 32 from the supply roll 31 into a position to be mounted upon the recording drum, in which position the light falling upon the photocell 91 is interrupted. The vacuum tube 201 becomes inoperative to release the relay 202, thereby stopping the motor 51. Upon the release of the relay 202 positive direct current potential is connected through the break contact 204 of relay 205, through the break contact 206 of relay 202, through the break contact 207 of relay 208, and through a make contact 209 of relay 194, to the line conductor L2.

At the transmitting station a three-position polar relay 210 is connected to the line conductor L2 and, in response to the positive potential applied thereto, the armature of the relay is moved to its lower contact M. A circuit is thus provided for the operation of relay 211, extending from the A bus bar, through the armature and lower contact M of the relay 210, and the winding of relay 211 to the B bus bar. The closure of the make contact 212 of this relay connects the A bus bar to one terminal of a locking solenoid 213, the other terminal of which is connected to the B bus bar, thereby energizing this solenoid to move its armature 214 to the left, thereby locking the armature 189 of relay 188 down in its operated position. At the same time a make contact 215 controlled by the operation of the locking armature connects the winding of the solenoid 213 to one blade 216 of a double-pole, double-throw switch 217. The purpose of this switch is to arrange the transmitter for either intermittent or continuous operation. Let us assume first that the transmitter is arranged for intermittent operation, in which case the switch blades 216 and 218 are placed in engagement with their right hand contacts. The winding of the locking solenoid 213 is thus connected through the switch blade 216 and its right hand contact, through a break contact 219 of a relay 220 and the switch contact 221 to the A bus bar. Such a connection permits the subsequent release of relay 211 and insures that the switch contacts remain locked in their closed positions as long as relay 220 is not operated.

The closure of make contact 222 of relay 211 connects the A bus bar through the switch contact 223 to one terminal of the winding of the relay 224. The other terminal of the winding of this relay is connected through a break contact 225 which is controlled by the arm engaging the scanning cylinder and which has for its purpose the detection of the presence or non-presence of a blank on the cylinder. In the latter case, the break contact 225 is closed, thereby completing the circuit for the operation of relay 224 to the B bus bar. The closure of make contact 226 of this relay connects the B bus bar to one terminal of the chute magnet 227 and to one terminal of a lamp 228. The other terminals of the lamp and the chute magnet are connected to the A' bus bar so that they become energized. The lamp illuminates a sign bearing the legend "Deposit message." The energization of the chute magnet 227 withdraws a closure 229 from the upper end of a chute 230 so that the message may be inserted therein, after which it is conveyed by gravity to the scanning cylinder 168, by which it is gripped and mounted for subsequent scanning.

As soon as the sheet is mounted upon the scanning cylinder, the contact 225 is opened, thereby releasing relay 224, which causes the deenergization of the chute magnet 227 and extinguishes the "Deposit message" lamp 228. Thus, the chute is closed to prevent the insertion of other sheets. The presence of a sheet upon the scanning cylinder effects the closure of contact 231, thereby connecting the B bus bar to one terminal of the half nut magnet 232. The other terminal of this magnet is connected through the switch contact 223 and the make contact 222 of relay 211 to the A bus bar. The half nut magnet thus becomes energized to move the half nut into engagement with the feed screw, thereby imparting scanning motion to the carriage containing the scanning apparatus. Connected in parallel with the winding of the half nut magnet is a lamp 233 which becomes illuminated to light a sign bearing the legend "Message Being Transmitted." The closure of make contact 234 of the half nut magnet 232 connects the positive terminal of the rectifier 191 through a break contact 235 of relay 185, through a break contact 236 of relay 220, to the line conductor L1.

At the recorder a three-position polar relay 240 is connected to the line conductor L1 and in response to the positive potential connected thereto the armature of this relay engages its right hand contact M'. The winding of relay 199 is thus connected between the bus bars A and B and, consequently, is energized to operate its contacts. The make contact 241 of this relay is connected to shunt the break contact 206 of relay 202 for a purpose to be more fully described hereinafter. Even though the break contact 198 of relay 199 is opened, the transformer 197 is maintained energized through a circuit extending through the make contact 242 of this relay and a break contact 243 of a relay 244.

On the next succeeding revolution of the transmitter cylinder 168 following the energization of the half nut magnet 232, a black spot 245 is scanned to generate a carrier current signal having a minimum amplitude. The reception of this signal at the recorder momentarily deenergizes the relay 180, permitting the closure of a break contact 246. A circuit is thus completed for the operation of relay 244 and extends from the positive terminal of a convenient source of direct current through a break contact 247 of a relay 248, the winding of relay 244, break contact 246 of relay 180, and the make contact 249 of relay 199, to ground. The closure of a make contact 250 of relay 244 locks this relay so that upon the reoperation of relay 180 in response to carrier current signals having amplitudes greater than the minimum amplitude the relay 244 is maintained energized independently of the relay 180. The break contact 243 of relay 244 deenergizes the transformer 197 and extinguishes the light 93 temporarily. The closure of a make contact 251 of relay 244 completes a circuit from a convenient source of direct current through the winding of the phasing magnet 84. This magnet actuates the roller 81, which forces the blank 32 into a position where it is gripped by the teeth of the recording cylinder and is thus wrapped around the cylinder in position for recording. The removal of the blank 32 from in front of the photoelectric cell 91 does not produce any result at this time because the light 93 is extinguished. As soon as the advancing edge of the recording blank reaches the arm 73, the contact 76 controlled thereby is closed. This operation connects the winding of relay 248 between the bus bars A and B, thereby operating the contacts of this relay. The opening of the break contact 247 deenergizes the relay 244, but connected in parallel with the winding of this relay is a condenser 252 which is of sufficient size to delay the release of the contacts of this relay until the recording blank is completely mounted upon the recording cylinder. After this operation has been completed, the contacts of relay 244 are released, thereby deenergizing the phasing magnet 84. The closure of break contact 243 of this relay again energizes the transformer 197 and operates the light 93 to excite the photoelectric cell 91 and thereby initiate the operation of the blank feeding motor 51 to convey another blank into position to be transferred to the recording cylinder when required. The opening of the break contact 206 of relay 202 in response to this operation opens one circuit from the positive source of potential connected to the break contact 204 of relay 205. However, this potential is not disconnected from the line conductor L2 by reason of the shunt path provided through the make contact 241 of relay 199.

The operation of relay 248 in response to the mounting of the recording blank upon the cylinder 65 completes a circuit from the B bus bar through a make contact 253 of this relay, through the windings of the half nut magnet 115 and the stylus magnet 105 to the A bus bar. The stylus 95 is thus moved into a recording position in contact with the blank 32 and the half nut is moved into engagement with the feed screw, thereby imparting a scanning movement to the carriage.

As the facsimile signals generated at the transmitter are received at the recorder, they are applied, after inversion and amplification, to the recording blank for the reproduction of the subject matter being scanned at the transmitter. These signals also are applied to the relay 180, which will vibrate as the amplitude of the signals varies between maximum and minimum values, but the closure of the break contact 246 of this relay is ineffective to operate the relay 244, since the operating circuit of this relay is open at the break contact 247 of relay 248. The opening and closing of the contact 192 of relay 180 alternately energizes and deenergizes the input circuit of the vacuum tube 193, but this circuit is provided with means for delaying the deenergization thereof during the interval of time that the contact 192 is open. This is accomplished by providing a condenser 254 connected between the grid of the tube and a source of negative potential. When the contact 192 is closed, this condenser is charged to a potential whereby the input circuit of the tube is energized. As soon as the contact 192 is opened, the charge on the condenser begins to dissipate through a leak resistor 255 and after the lapse of a predetermined time, the potential of the grid of the tube becomes sufficiently negative with respect to its cathode that the plate current is reduced to a value which is insufficient to maintain the relay 194 operated. However, the values of the condenser 254 and the leak resistor 255 are chosen so that the plate circuit of the tube 193 draws sufficient current during the normal operation of recording that the relay 194 remains operated.

At the transmitter, when the carriage 256 containing the scanning apparatus has advanced to the end of its movement, a contact 257 operated by the carriage is closed, thereby closing a circuit from the A bus bar through the winding of relay 185, and the break contact 258 of relay 224, to the B bus bar. Relay 185 is thus energized to open its break contact 235 and thereby disconnect the positive potential from the line conductor L1.

At the recorder, the disconnection of positive potential from line conductor L1 disengages the armature of polar relay 240 from its right hand contact M' and thereby opens the operating circuit for relay 199. The release of this relay closes a circuit from positive potential, through the make contact 259 of relay 248, the winding of relay 205, and the break contact 260 of relay 199, to ground. The operation of relay 205 closes a circuit through a make contact 261 to connect the winding of the blank stripping magnet 124 between the bus bars A and B. The sheet containing the recording is thus removed from the cylinder 65, permitting the contact 76 to be opened. Relay 248 is thus released and the closure of a break contact 262 of this relay completes a circuit from the B bus bar through a make contact 263 of relay 205, through the winding of relay 208, the normally closed contact 264 of the key switch 265, a break contact 266 of relay 267, to the A bus bar. Relay 208 is thus operated and locked through its make contact 268. A light 269 is connected in parallel with this relay and is also energized to signal the attendant that a message has been received.

It will be noted that the operating circuit of the stripping magnet 124 includes the make contact 261 of relay 205 which, at the time that the relay 248 is released by the opening of contact 76 controlled by the recording sheet, is deenergized by the opening of make contact 259 of relay 248. However, it is provided with a condenser 270 connected in parallel with its winding which delays the release of its contacts until after the sheet has been completely removed from the cylinder.

While these functions are being performed at the recorder, it should be pointed out that, immediately upon the operation of relay 205, the positive potential which had been connected to line conductor L2 during the recording operation is removed therefrom by the opening of a break contact 204 of this relay. Also, by the time this contact is permitted to reclose following the deenergization of relay 205, a circuit for this positive potential is opened at the break contact 207 of relay 208, which has operated in the meantime.

The removal of the positive potential from the line conductor L2 produces a response at the transmitter by the relay 210 whereby the armature of this relay is disengaged from its lower contact M, thereby releasing relay 211. The opening of make contact 222 of this relay deenergizes the half nut magnet 232, thereby opening the contacts controlled thereby and permitting the return of the carriage 256 to its original position.

At the transmitter, while the half nut magnet 232 is energized during a scanning operation, a make contact 271 is closed and shunts the break contact 184 of relay 185 so that, when this relay is operated to open its break contacts in response to the operation of the carriage controlled contact 257, the locking circuit for the relay 182 is maintained through the half nut magnet contact. But as soon as the positive potential has been removed from the line conductor L2 following the receipt of the end-of-message signal at the recorder to release relay 211 and thereby release the half nut magnet, the contact 271 is opened to deenergize the relay 182. This relay remains in this condition until the push button 181 is operated at some future time.

The attendant at the recorder has facilities for making another recording of the same subject matter if, upon inspection, the original recording is unsatisfactory. To do this the handle of the key switch 265 is momentarily operated to the right, thereby opening the contact 264 and unlocking relay 208 and at the same time extinguishing the light 269. The release of relay 208 reconnects positive potential through its break contact 207 to the line conductor L2.

At the transmitter, the polar relay 210 is again operated to its lower contact M and the transmitting mechanism is started upon the same cycle of operation as previously described. The transmitter is provided with means for generating an end-of-message signal before the carriage 256 reaches the end of its travel to close the contact 257. Such a facility is for the purpose of economizing the line time utilized for the transmission of the facsimile signals in the case where a relatively short message is to be transmitted. In the case of a short message, a switch 272, the handle of which is accessible from the outside of the machine, is moved to the right as viewed in the drawing. The switch is locked in this position by the energization of a magnet 273 through a circuit which extends from the A bus bar through the winding of the magnet, a make contact 274 and a break contact 184 of relay 185 to the B bus bar. As soon as the carriage 256 has traveled a sufficient distance to effect an engagement of a roller 275 with some convenient stationary member 276, a contact 277 is closed to complete an operating circuit for the relay 185 which extends from the A bus bar through the contact 277, the make contact 278, the winding of relay 185, and the break contact 258 of relay 224 to the B bus bar. The opening of break contact 235 of relay 185 disconnects the positive potential from the line conductor L1 to control the recorder mechanism in the manner described. The opening of the break contact 184 of this relay opens the locking circuit for the magnet 273, thereby releasing the switch 272 to its normal position.

At the recorder, when the attendant is satisfied with the recording, the handle of the key switch 265 is operated to the left to close a contact 279. A circuit is thus completed from the B bus bar through the make contact 268 of relay 208, the switch contact 279, the winding of relay 280, the closed switch contact 264, the break contact 266 of relay 267 to the A bus bar. Relay 280 is operated and locked through its make contact 281. Closure of make contact 282 of this relay connects negative potential through the break contact 283 of relay 248, through the make contact 284 of relay 208 and make contact 209 of relay 194 to the line conductor L2.

At the transmitting station, the negative potential connected to the line conductor L2 effects the operation of the armature of relay 210 to its upper contact S. A circuit is thus established from the A bus bar through the armature and contact S of relay 210, the switch contact 285 and the winding of the blank stripping magnet 286 to the B bus bar. A lamp 287 connected in multiple with the winding of the stripping magnet is also energized to illuminate a sign bearing the legend "Message accepted." As soon as the sheet bearing the subject matter transmitted has been removed from the cylinder, the contact 225 is reclosed, which establishes a circuit from the A bus bar through the armature and upper contact S of relay 210, the winding of relay 220, the break contact 288 of relay 224, the contact 225, to the B bus bar. The relay 220 is thus energized to open, at the break contact 219, the locking circuit of the locking solenoid 213. The armature 189 of relay 188 is released, permitting the opening of the switch contacts controlled thereby. The opening of contact 190 disconnects the A bus bar from the A' bus bar, thereby deenergizing the rectifier 191, the driving motor 169 and the chopper motor 173, and the exciter lamp 166.

The release of the armature 189 of the relay 186 closes a circuit from the A bus bar through switch contact 289, the make contact 290 of the relay 220, and the switch contact 291 to reenergize the locking solenoid 213. At the same time a lamp 292 is energized to illuminate a sign bearing the legend "In use." The operation of the armature 214 controlled by the locking solenoid at this time prevents the movement of the armature 189 in response to any possible reenergization of the relay 188.

The scanning apparatus which is deenergized upon the release of the switch contacts controlled by the relay 188 in a short time results in the disconnection of the carrier current from the line conductors. At the recorder the absence of the carrier current signals causes the release of relay 180, and at a predetermined time following the release of this relay the timing apparatus associated with the input circuit of the vacuum tube 193 becomes effective to open the plate circuit and causes the release of relay 184. The opening of contact 195 of this relay disconnects the A bus bar from the driving motor 67 and the primary winding 196 of transformer 197 and unlocks relays 208 and 280. In this manner power is disconnected from the recording apparatus and it is restored to its normal idle condition in which it remains until the push button 181 is again operated at the transmitter. The opening of contact 195 disconnects negative potential from line L2, which restores the transmitter polar relay 210 to normal and thereby releases relay 220 and deenergizes solenoid 213 and the lamp 292.

In accordance with the operation of the system described up to this point, the transmitting and recording mechanisms are completely shut down following the transmission and satisfactory recording of each message. The system may be arranged for continuous operation by placing the blades of the switch 217 at the transmitter on their left hand contacts. When the push button 181 is operated to energize relay 182, the switch contact relay 188 is operated as before to start the transmitting mechanism whereby a carrier current signal is generated. The recording apparatus responds to this signal as in the foregoing description, and the locking solenoid 213 at the transmitter is energized in response to a signal transmitted over the line conductor L2 from the recorder. This solenoid is locked by a circuit which extends from the B bus bar through the winding of the solenoid, the make contact 215, and through the switch blade 216 and its left hand contact to the A bus bar. It will be noted that once this circuit is closed, it cannot be opened by the operation of any of the relays as in the previous case. Consequently, the switch contacts remain closed, maintaining the transmitting apparatus in continuous operation.

The opening of the chute 230 and the subsequent transmission and recording of the message is accomplished in the same manner as that described previously. When the end-of-message signal is generated at the transmitter, the recorded message is removed from the cylinder 65, after which the relay 208 is operated and locked, and the lamp 269 is energized. For this type of operation the key switch 265 may be left in its normal position, as shown, while a message is being recorded, in which case the attendant may make a second recording of the message or may accept it, if satisfactory, by the previously described manipulation of the switch.

When the key switch is operated to close the contact 279, relay 280 is operated and locked as before to apply negative potential to the line conductor L2. The polar relay 210 at the transmitter is operated to its upper contact S to remove the message bearing sheet from the transmitter cylinder, after which relay 220 is operated as described. The closure of make contact 293 of this relay connects the negative terminal of the rectifier 191 to line conductor L1.

At the recorder, in response to this potential polar relay 240 is operated to its left hand contact S'. A circuit is thus closed for the operation of relay 267. The opening of the break contact 266 of this relay opens the locking circuit for relays 208 and 280, thereby releasing these relays. The opening of either of the make contacts 284 or 282 of these respective relays removes the negative potential from the line conductor L2.

The polar relay 210 at the transmitter in response to the removal of this potential is deenergized, thereby disengaging its armature from its upper contact S. When the sheet stripping magnet 286 is deenergized, the "Message accepted" lamp 287 is extinguished and the relay 220 is deenergized. Thus, the transmitter is released for further operation if the recorder is in a condition to record.

If a blank 32 is positioned in a recorder in readiness for mounting upon the cylinder 65, relay 202 will be released and positive potential applied to the line conductor L2.

This potential produces a response by the polar relay 210 whereby the chute closure 229 is withdrawn, making the mouth of the chute 230 accessible for the insertion of another message bearing sheet. The apparatus remains in this condition until such a sheet is deposited in the transmitter chute, after which operation of the apparatus is resumed as previously described.

At the recorder the attendant may place the key switch 265 permanently in the "Accept" position to maintain the contact 279 closed at all times. In this case, as soon as the sheet bearing the recording has been removed from the cylinder to permit the release of relay 248, relays 208 and 280 operate and lock simultaneously, after which negative potential is applied to the line conductor L2.

The sequence of operations at the transmitter, in response to this potential, is identical with that previously described and results in the application of negative potential to the line conductor L1. At the recorder this effects the release of relays 208 and 280, thereby restoring the recording apparatus to a condition for making another recording.

It will be noted that, with the key switch 265 locked in the "Accept" position, it is not possible to obtain a second recording of a message. The transmitting and recording machines will operate through their described cycles as long as additional message bearing sheets are inserted in the transmitter chute.

The system is shut down by the opening of the double throw switch 217 at the transmitter. This operation opens the locking circuit for the locking solenoid 213 and permits the opening of the switch contacts, thereby disconnecting the power source from the transmitting apparatus. The absence of the carrier current from the line conductor results in the disconnection of power from the recorder as described.

The nature of the invention may be ascertained from the foregoing description of an illustrative embodiment thereof. The scope of the invention is defined by the appended claims.

What is claimed is:

1. In a facsimile machine, a rotary recording cylinder, stationary means for supporting a sheet opposite said cylinder in spaced relation thereto, and means for moving said sheet laterally off said supporting means into engagement with said cylinder during rotation thereof, whereby the sheet is wrapped around the cylinder for scanning.

2. In a facsimile machine, a rotary recording cylinder, stationary means for supporting a sheet opposite said cylinder in spaced relation thereto, means for moving said sheet laterally off said supporting means into engagement with said cylinder during rotation thereof, whereby the sheet is wrapped around the cylinder for scanning, and an electromagnetic device for operating said sheet moving means.

3. In a facsimile machine, a rotary recording cylinder having circumferential teeth, a stationary stop arranged opposite said cylinder and spaced therefrom to support a sheet in operative spaced relation to said cylinder, and means for moving said sheet laterally off said stop into engagement with said cylinder and teeth during rotation of the cylinder, whereby the sheet is wrapped around the cylinder for scanning.

4. In a facsimile machine, a rotary scanning cylinder adapted to receive a sheet which is wrapped around it so that the edges overlap, said sheet having a cutaway portion at one corner to provide an open space between the edges at one end of the sheet, a recording member arranged to engage said sheet over the cylindrical area defined by the length of the overlapping edges, and a stripping member arranged to extend into said open space for removing the recorded sheet from the cylinder.

RALEIGH J. WISE.
GARVICE H. RIDINGS.
ROBERT D. PARROTT.

REFERENCES CITED

The following references are of record in the file of this patent:

UNITED STATES PATENTS

| Number | Name | Date |
| --- | --- | --- |
| 561,773 | Dexter | June 9, 1896 |
| 1,226,034 | Vick | May 15, 1917 |
| 1,477,024 | Aitchison | Dec. 11, 1923 |
| 2,209,720 | Rustad | July 30, 1940 |
| 610,339 | Atherton | Sept. 6, 1898 |
| 2,262,715 | Wise et al. | Nov. 11, 1941 |
| 2,202,359 | Tauschek | May 28, 1940 |
| 1,090,128 | Avers | Mar. 17, 1914 |
| 1,272,671 | Jonson | July 16, 1918 |
| 1,535,520 | Cvitkovich | Apr. 28, 1925 |
| 1,208,646 | Power | Dec. 12, 1916 |
| 1,397,143 | Parker | Nov. 15, 1921 |
| 1,894,093 | Griffin | Jan. 10, 1933 |